United States Patent
Stolzenberg et al.

(10) Patent No.: US 12,405,659 B2
(45) Date of Patent: *Sep. 2, 2025

(54) GAZE TIMER BASED AUGMENTATION OF FUNCTIONALITY OF A USER INPUT DEVICE

(71) Applicant: Magic Leap, Inc., Plantation, FL (US)

(72) Inventors: Karen Stolzenberg, Venice, CA (US); Marc Alan McCall, Plantation, FL (US); Frank Alexander Hamilton, IV, Martinsburg, WV (US); Cole Parker Heiner, Vista, CA (US); John Austin Day, Miami, FL (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,690

(22) Filed: Jun. 28, 2024

(65) Prior Publication Data

US 2024/0353919 A1 Oct. 24, 2024

Related U.S. Application Data

(63) Continuation of application No. 18/326,561, filed on May 31, 2023, now Pat. No. 12,056,271, which is a
(Continued)

(51) Int. Cl.
*G06F 3/01* (2006.01)
*G02B 27/00* (2006.01)
(Continued)

(52) U.S. Cl.
CPC .......... *G06F 3/011* (2013.01); *G02B 27/0093* (2013.01); *G02B 27/0101* (2013.01);
(Continued)

(58) Field of Classification Search
None
See application file for complete search history.

(56) References Cited

U.S. PATENT DOCUMENTS

| 6,850,221 | B1 | 2/2005 | Tickle |
| 10,627,895 | B2 | 4/2020 | Kingsbury et al. |

(Continued)

FOREIGN PATENT DOCUMENTS

| JP | 2014179963 A | 9/2014 |
| JP | 2015118556 A | 6/2015 |

(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Jwalant Amin
(74) *Attorney, Agent, or Firm* — KLINTWORTH & ROZENBLAT LLP

(57) ABSTRACT

A wearable computing system that includes a head-mounted display implements a gaze timer feature for enabling the user to temporarily extend the functionality of a handheld controller or other user input device. In one embodiment, when the user gazes at, or in the vicinity of, a handheld controller for a predetermined period of time, the functionality of one or more input elements (e.g., buttons) of the handheld controller is temporarily modified. For example, the function associated with a particular controller button may be modified to enable the user to open a particular menu using the button. The gaze timer feature may, for example, be used to augment the functionality of a handheld controller or other user input device during mixed reality and/or augmented reality sessions.

16 Claims, 5 Drawing Sheets

Related U.S. Application Data continuation of application No. 17/547,132, filed on Dec. 9, 2021, now Pat. No. 11,703,943, which is a continuation of application No. 17/135,352, filed on Dec. 28, 2020, now Pat. No. 11,226,678.

(60) Provisional application No. 62/966,238, filed on Jan. 27, 2020.

(51) Int. Cl.
    *G02B 27/01*      (2006.01)
    *G06F 3/048*      (2013.01)
    *G06F 3/0482*     (2013.01)
    *G06F 3/023*      (2006.01)

(52) U.S. Cl.
CPC ..... *G02B 27/0172* (2013.01); *G02B 27/0179* (2013.01); *G06F 3/012* (2013.01); *G06F 3/013* (2013.01); *G06F 3/048* (2013.01); *G06F 3/0482* (2013.01); *G02B 27/01* (2013.01); *G02B 2027/0138* (2013.01); *G02B 2027/0187* (2013.01); *G06F 3/017* (2013.01); *G06F 3/023* (2013.01)

(56) References Cited

U.S. PATENT DOCUMENTS

| | | |
|---|---|---|
| 10,802,582 B1 | 10/2020 | Clements |
| 11,226,678 B2 | 1/2022 | Stolzenberg et al. |
| 2005/0047629 A1 | 3/2005 | Farrell et al. |
| 2006/0028436 A1 | 2/2006 | Armstrong |
| 2007/0081123 A1 | 4/2007 | Lewis |
| 2010/0007601 A1 | 1/2010 | Lashina et al. |
| 2012/0127062 A1 | 5/2012 | Bar-Zeev et al. |
| 2012/0162549 A1 | 6/2012 | Gao et al. |
| 2012/0300061 A1 | 11/2012 | Osman et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0204029 A1 | 7/2014 | Lopez et al. |
| 2014/0218468 A1 | 8/2014 | Gao et al. |
| 2014/0237366 A1 | 8/2014 | Poulos et al. |
| 2014/0267420 A1 | 9/2014 | Schowengerdt et al. |
| 2014/0268054 A1 | 9/2014 | Olsson et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2017/0038837 A1 | 2/2017 | Faaborg et al. |
| 2017/0076503 A1 | 3/2017 | Tamaoki et al. |
| 2017/0337742 A1 | 11/2017 | Powderly et al. |
| 2018/0053284 A1 | 2/2018 | Rodriguez et al. |
| 2018/0157398 A1 | 6/2018 | Kaehler et al. |
| 2021/0042513 A1 | 2/2021 | Kato et al. |
| 2021/0133991 A1 | 5/2021 | Tamama et al. |
| 2021/0232212 A1 | 7/2021 | Stolzenberg et al. |

FOREIGN PATENT DOCUMENTS

| | | |
|---|---|---|
| JP | 2018084875 A | 5/2018 |
| JP | 2018514836 A | 6/2018 |
| JP | 2018124907 A | 8/2018 |
| JP | 2018190380 A | 11/2018 |
| WO | WO2021154437 A1 | 8/2021 |

OTHER PUBLICATIONS

Azuma, "a Survey of Augmented Reality," Teleoperators and Virtual Environments 6, 4 (Aug. 1997), pp. 355-385. https://web.archive.org/web/20010604100006/http://www.cs.unc.edu/azuma/ARpresence.pdf.

Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu/raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

International Search Report and Written Opinion for PCT Application No. PCT/US2020/067152, dated Mar. 8, 2021.

Rivu et al. "GazeButton: enhancing buttons with eye gaze interactions", ETRA '19: Proceedings of the 11th ACM Symposium on Eye Tracking Research & Applications, Jun. 2019. Retrieved on Feb. 18, 2021. Retrieved from <URL: https://dl.acm.org/doi/pdf/10.1145/3317956.3318154> entire document.

Extended European Search Report issued in European Application No. 20916802.0 mailing date Jan. 16, 2024, (15 pages).

Non-Final Office Action issued in U.S. Appl. No. 17/547,132 dated Oct. 3, 2022 (36 pages).

Final Office Action issued in U.S. Appl. No. 17/547,132 dated Dec. 23, 2022 (26 pages).

Non-Final Office Action issued in U.S. Appl. No. 18/326,561 dated Dec. 15, 2024 (65 pages).

Non-Final Office Action issued in U.S. Appl. No. 17/135,352 dated Jun. 15, 2021 (30 pages).

GAZE TIMER BASED AUGMENTATION OF FUNCTIONALITY OF A USER INPUT DEVICE

CROSS-REFERENCE TO RELATED APPLICATION(S)

This application is a continuation of U.S. application Ser. No. 18/326,561, filed May 31, 2023. U.S. application Ser. No. 18/326,561 is a continuation of U.S. application Ser. No. 17/547,132, filed Dec. 9, 2021. U.S. application Ser. No. 17/547,132 is a continuation of U.S. application Ser. No. 17/135,352, filed Dec. 28, 2020, which claims the benefit of U.S. Provisional Appl. No. 62/966,238, filed Jan. 27, 2020. Priority is claimed to of U.S. application Ser. No. 18/326, 561, U.S. application Ser. No. 17/547,132, U.S. application Ser. No. 17/135,352, and U.S. Provisional Appl. No. 62/966, 238. The disclosures of the aforesaid applications are hereby incorporated herein by reference.

TECHNICAL FIELD

The present disclosure relates to augmented reality and mixed reality systems, and more particularly, to user interfaces and processes for extending the functionality of a handheld controller or other user input device in such systems.

BACKGROUND

Modern computing and display technologies have facilitated the development of systems for so called "virtual reality," "augmented reality," and "mixed reality" experiences, in which digitally reproduced images or portions thereof are presented to a user such that they appear real. A virtual reality, or "VR," scenario typically involves the presentation of digital or virtual image information without transparency to other actual real-world visual input. An augmented reality, or "AR," scenario typically involves the presentation of digital or virtual image information as an augmentation to visualization of the actual world around the user. A mixed reality, or "MR," scenario typically involves merging real and virtual worlds to produce new environments in which physical and virtual objects co-exist and interact in real time.

Some systems, such as those available from Magic Leap, include a headset and a handheld controller. The headset typically includes tracking cameras for mapping the user's environment, inward-facing eye tracking cameras, and lenses with waveguides that form an inward-facing display. The headset may also include one more other types of sensors. The controller typically includes one or more types of input elements, such as buttons and/or a touchpad, that are used to control an MR or AR session.

A system that supports MR and AR sessions may also include a separate computing device, such as a wearable device that is connected by a cable to the headset. The computing device may execute various software components, such as an operating system and applications. One or more of these software components may map particular controller input elements or actions to particular functions that can be invoked by the user. For example, the operating system may map a particular button of the handheld controller to a particular function, or may map a specific touchpad action (such as a single or double tap action) to another function.

SUMMARY

One problem with existing MR and AR systems is that the number of functions made available to the user via the handheld controller, or any other input device or object, is restricted by the number of user input buttons or surfaces included on the controller (or device, or object), and/or by the number of user actions (such as single and double tap actions and gestures) that can be performed on such input devices. Although the controller's functionality can sometimes be extended by using session context to expose new controller-based functions, in many cases it is desirable to give the user an intuitive way to selectively extend the controller's functionality.

Various use cases, such as networked copresence experiences for sharing app content and chatting with both co-located and remote users represented as avatars, benefit from flexible, on-demand interfaces that can be kept out of the way of the user. Such sessions may require the user to keep track of different elements, e.g., avatars, shared content, menus, etc. The disclosure herein describes a system and method that allows the user to access a session menu that doesn't distract the user from these other social activities and the communication goals of the overall experience. In particular, described below are methods for accessing a contextual menu without any existing UI or world-based reference, so that users can move around, collaborate and communicate with others and still access a session user interface without the inconvenience of having to return to a specific world location (e.g., where the session menu may be statically located), in some embodiments. In one embodiment, the session user interface is configured to follow the user wherever they are (such as using the systems and method of U.S. Provisional Appl. No. 62/965,708, filed Jan. 24, 2020, titled CONTENT MOVEMENT AND INTERACTION USING A SINGLE CONTROLLER, the entire disclosure of which is hereby incorporated herein by reference. Thus important session tools (e.g., mute, block, invite, exit) are near the user at all times, in a discreet, easy to access location. Within these shared copresence experiences, access to the session tools (e.g., in a session menu) may be hidden until requested by the user, such as through the gaze timer functionality discussed herein. This gaze timer functionality provides, for example, a method to expand functionality of existing user input devices to allow the user to request the session menu when needed without limiting functionality of the input device that is available in the shared copresence experience.

The present disclosure addresses the above and other problems by providing a user interface feature (also referred to as a "gaze timer" or "focus timer" feature) that enables the user to temporarily modify the functionality of one or more buttons or surfaces of the handheld controller (or other user input device) by performing a defined viewing or "gazing" action for a predetermined period of time. For example, in a preferred embodiment, when the user gazes at, or within a predefined region of, the handheld controller for a predetermined period of time (such as 0.5 seconds or one second), the mapping of controller actions to functions is temporarily modified to make one or more additional functions or selections available, or to temporarily switch to an alternate mapping for one or more user input devices. The predetermined amount of time may be selected to reduce the likelihood of accidental activation. In some embodiments, the modified mapping remains in effect until the gazing action ends, or until the user performs a particular action (e.g., presses a button whose function was modified).

As one example, the function associated with a particular button (or other user input element) of the handheld controller may be temporarily modified in response to a controller gaze action such that depression of the button causes the headset to display a menu that is not otherwise displayable via the controller. Thus, a user wishing to display this menu can do so (optionally without regard to session context) by gazing at the controller for the predetermined time period and then pressing the button. The system may restore the button's functionality when the user presses the button, or when the user closes the menu. In some embodiments, the system may additionally or alternatively restore the button's functionality when the user discontinues the controller gaze operation.

When the gaze action begins, the headset may display a "gaze timer" icon, and/or another type of visual indicator to indicate that a controller gaze action is detected. The appearance of this icon or visual indicator may then be updated substantially continuously to graphically depict the amount of time that the gaze action needs to continue before the controller's functionality will be modified. Once the timer expires (i.e., the predetermined gaze duration is reached), the display may be updated to indicate that the controller's functionality has been modified. For example, in the menu example above, a message may briefly be displayed indicating that the user can display the menu by pressing a particular button.

The gaze timer may be implemented within software executed by one or more components of a wearable computing system that supports MR and/or AR sessions. The wearable computing system may detect the gaze actions based on head pose, eye pose, or both. In some embodiments, the target of the gaze action may be an object other than the controller. For example, the user could perform a hand gaze action for the predefined time period while performing a particular hand pose or gesture.

Throughout the drawings, reference numbers may be re-used to indicate correspondence between referenced elements. The drawings are provided to illustrate example embodiments described herein and are not intended to limit the scope of the disclosure.

DETAILED DESCRIPTION

I. Example System Components

Figure 1:
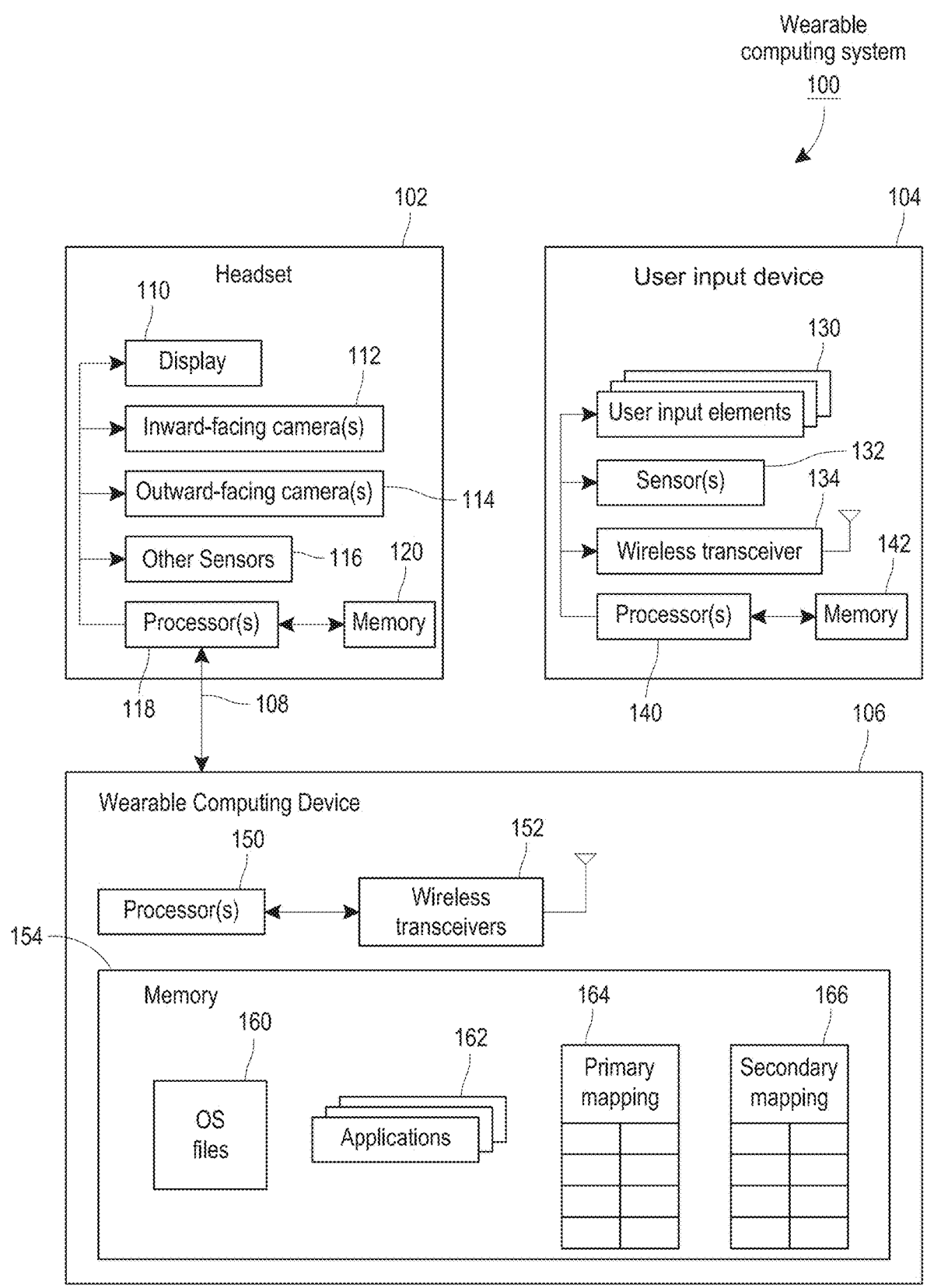
FIG. 1 illustrates the primary components of a wearable computing system in which the gaze timer feature may be implemented according to one embodiment.
Figure 2:
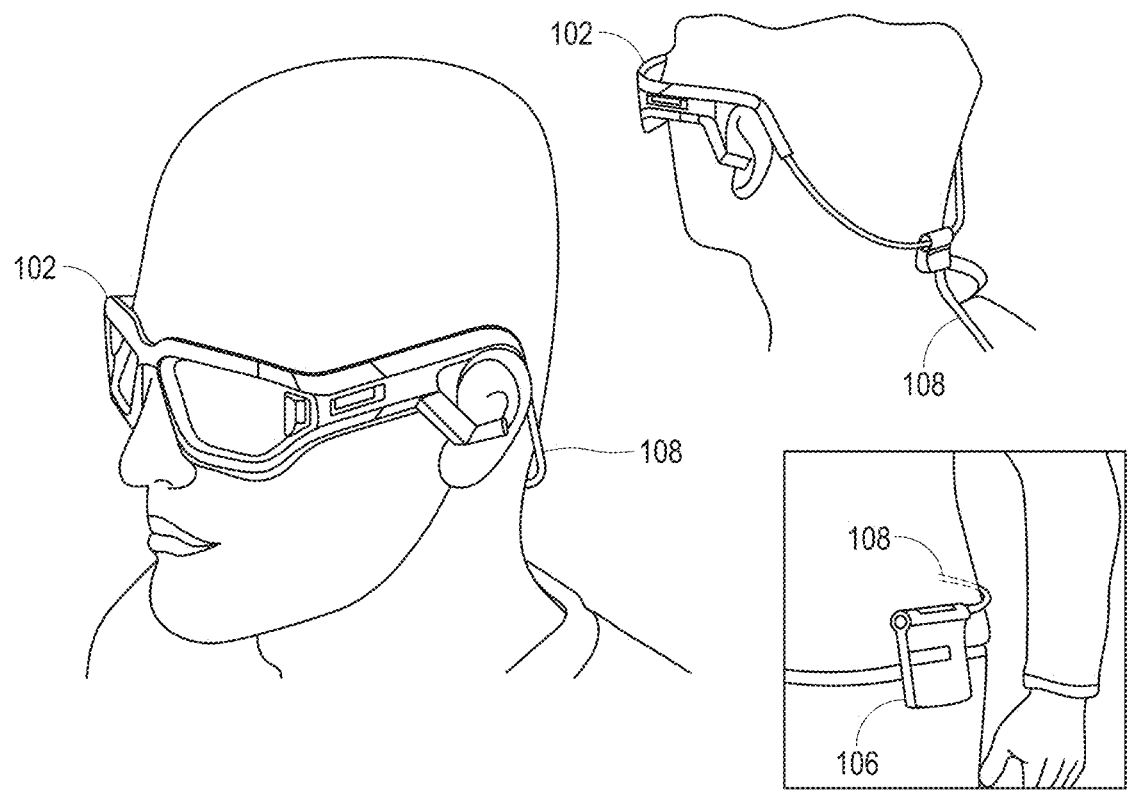
FIG. 2 illustrates examples of the headset and wearable computing device components of FIG. 1.
Figure 3:
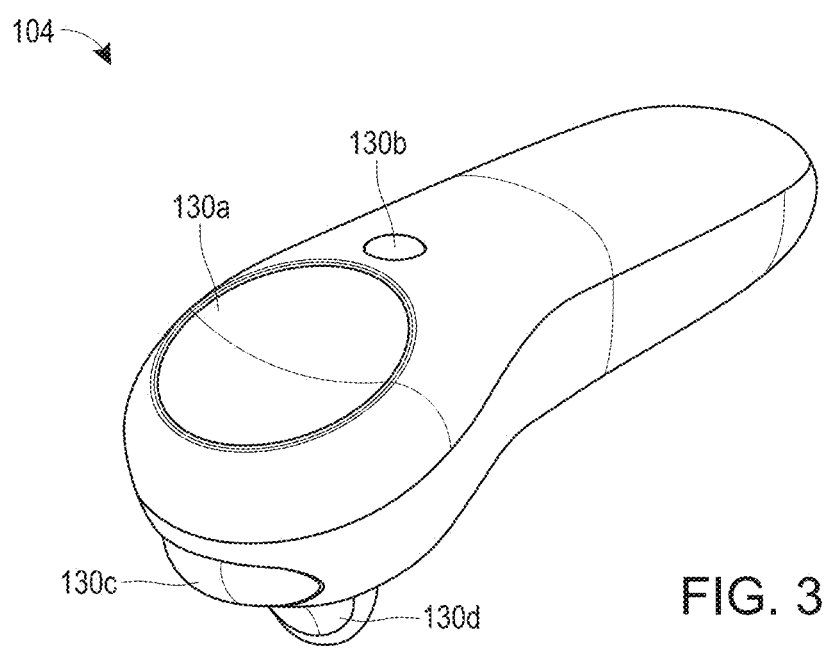
FIG. 3 illustrates one example of the handheld controller of FIG. 1.

FIGS. 1-3 illustrate the primary components of a wearable computing system 100 that implements a gaze timer feature according to one embodiment. The wearable computing system 100 includes a headset 102, a handheld controller 104, and a wearable computing device 106 that is connected to the headset by a cable 108 or wirelessly. Other configurations of wearable computing systems are possible, such as a system in which some or all components of the wearable computing device 106 are integrated into the headset 102 and/or the handheld controller 104 (or another type of user input device). As explained below, the gaze timer in the illustrated embodiment is implemented in software executed by the wearable computing device 106, and enables a user to efficiently and intuitively extend the functionality of the handheld controller by performing a particular type of gaze operation for a defined period of time. The disclosed process can also be used to augment the functionality of other types of user input devices, such as keyboards, wands, pointing devices, electronic drawing pads, headsets, joysticks, and mobile phones.

As shown in FIG. 1, the headset 102 includes a display 110, one or more inward-facing cameras 112, one or more outward facing cameras 114, other sensors 116, one or more hardware processors 118, and an array of memory 120. As shown in FIG. 2, the headset 102 may resemble a pair of goggles or eyeglasses having translucent or transparent lenses that form the display 110. In some embodiments, the headset may be any suitable head-mounted display or device, and may have a single lens and/or display for a single eye, two lenses and/or displays for two eyes, or a single lens and/or display for two eyes. The display 110 may be implemented using waveguides that are incorporated into the lenses, as disclosed in U.S. Patent Pub. 2018/0157398, the disclosure of which is hereby incorporated by reference. The headset 102 may alternatively be in the form of a helmet that partially or fully covers the user's head. During a mixed reality or augmented reality session, the display 110 typically augments the user's view of their real-world environment (as seen through the lenses) with digital objects and information.

The inward facing camera or cameras 112, if present, are used to track the movement and position of one or both eyes of the user. The tracked state of the user's eye(s) is referred to as "eye pose." Other types of sensors other than a camera may additionally or alternatively be used to track the user's eyes. The gaze timer may be implemented based solely on head pose, without tracking eye movement, in which case the inward facing camera(s) 112 may be omitted or used solely for other functions.

The other sensors 116 depicted in FIG. 1 may include various types of sensors for sensing head position, movement and orientation; examples include accelerometers, inertial measurement units (IMUs), compasses, radio devices and gyroscopes. The sensed position and orientation of the user's head is referred to as "head pose." The processor(s) 118 may include a general-purpose processor that executes code stored in the memory 120, and/or may include one or more specialized processors, such as a display processor/controller or a head pose processor. The specialized processors may, in some embodiments, be implemented as an ASIC (application specific integrated circuit), FPGA, and/or other specialized hardware device. Although not illustrated in FIG. 1, the headset 102 may also include other types of input and output devices, such as a microphone and speakers.

As shown in FIG. 1, the handheld controller 104 includes a set of user input elements 130, such as buttons, a touchpad, a joystick, a rotatable wheel, a microphone, etc. These user input elements 130 may be used to control various aspects of an MR (or VR or AR session). In the example shown in FIG. 3, the controller's input elements include a circular touchpad 130*a*, a Home/Back button 130*b*, a Bumper button 130*c*, and a Trigger button 130*d*. As explained below, the wearable computing device 106 (or another component of the system 100) may store mapping data that maps specific user input elements 130 and associated user actions to specific functions. Typically, the Home/Back button 130*b* is used to move backward within an application or to return to a Launcher; the Bumper button 130*c* is used to display context menus; and the Trigger button is used for grab and selection interactions. The touchpad 130*a* is capable of detecting a variety of gestures that can be performed with the thumb, and each gesture can trigger a respective function or operation. As will be recognized, the handheld controller 104 can have different types and numbers of input elements 130 than those shown in FIG. 3, and/or may have different functionality associated with each input element 130.

The handheld controller 104 also includes a set of one or more sensors 132, such as sensors for sensing the controller's position and orientation (referred to as "controller pose"). Examples include accelerometers, inertial measurement units (IMUs), compasses, radio devices, and gyroscopes. The controller 104 is preferably a multi degree-of-freedom (DOF) controller (e.g., a 3DOF or 6DOF controller), meaning that it can sense user input in multiple translations (e.g., left/right, forward/backward, or up/down) and/or rotations (e.g., yaw, pitch, or roll) of the controller. A multi-DOF controller which supports the translation movements may be referred to as a 3DOF controller while a multi-DOF controller which supports the translations and rotations may be referred to as a 6DOF controller.

As further shown in FIG. 1, the handheld controller 104 may also include a wireless transceiver 134 (or multiple wireless transceivers), such as a Bluetooth or WIFI transceiver, or a transceiver that is not based on a wireless standard. The wireless transceiver 134 enables the handheld controller 104 to communicate wirelessly with the wearable computing device 106, and possibly other devices. For example, when the user performs an input operation (e.g., presses a button) on the controller 104, the wireless transceiver 134 may notify the wearable computing device 106 of the input event. In other embodiments, the wireless transceiver 134 may be omitted, in which case the handheld controller 104 may be connected by a cable to the wearable computing device 106. As shown, the handheld controller 104 also includes one or more hardware processors 140 connected to the aforementioned controller components 130, 132, 134, and includes a memory 142 that stores program code executed by the processor 140. The controller 104 may also include other types of components, such one or more haptic devices for providing haptic feedback to the user, and a pose processor for determining the pose (position and orientation) of the controller.

As further shown in FIG. 1, the wearable computing device 106 includes one or more hardware processors 150, one or more wireless transceivers 152 (e.g., Bluetooth, WIFI, cellular, etc.), and a memory 154, such as an array of solid-state memory devices. The memory 154 stores operating system (OS) files of an operating system that supports mixed and augmented reality applications and sessions, and includes the application files of one or more applications 162, such as mixed and/or augmented reality applications. As noted above, in some implementations the components and/or functionality discussed with reference to wearable computing device 106 may be implemented in the headset 102, such that a separate wearable computing device 106 may be omitted from the wearable computing system.

As shown in FIG. 1, the memory of the wearable computing device 106 also stores a set of mapping tables 164, 166 that map input operations on the handheld controller 104 to corresponding functions. These tables may be maintained and used by the operating system 160, the applications 162, or both. The primary mapping table 164 stores the mappings that are used when the controller's functionality is not being extended by the gaze timer feature. Each entry in this table 164 maps a user input operation on the controller 104 (e.g., activation of a particular button, or a particular gesture or tap sequence on a touch pad) to a corresponding function to be performed by the wearable computing system 100.

The secondary mapping table 166 stores the mappings that are used when the controller's functionality is being temporarily extended using the gaze timer feature. In some embodiments, the extension in functionality may apply to only a single user input element 130 of the handheld controller 104; for example, the functionality of a single button (e.g., 130*b*, 130*c* or 130*d* in FIG. 3) may be modified, while functionality of the controller's other user input elements 130 may remain unchanged. Thus, the primary and secondary mapping tables 164, 166 may differ in only a single mapping, or the secondary mapping 166 may include only mappings for inputs that are different than those in the primary mapping 164. In other embodiments, two or more of the mappings may differ between these two mapping tables 164, 166. For example, the functionality of two or more different controller buttons, or of two or more different touchpad gestures, may be modified.

Although the illustrated embodiment uses mapping tables, the gaze timer feature may alternatively be implemented without mapping tables; for example, the change(s) in controller functionality could be hard coded in the executable code that implements the gaze timer feature. In addition, although only one primary mapping table 164 and one secondary mapping table 166 are shown, multiple primary tables and multiple secondary tables may be stored and used. For example, different applications 162 may use different primary/secondary mapping table pairs and/or different controllers (or other user input devices or objects) may use different primary/secondary mapping table pairs.

In some embodiments, the wearable computing system 100 may interact with one or more types of external devices. For example, the system 100 may communicate with one or more radio frequency devices (e.g., beacons) that are mounted in fixed locations in the room or building of the user for purposes of tracking the location and orientation of the headset 102 and controller 104. As another example, the wearable computing system 100 may communicate with a remote computing system, such as a remote server or cloud-based system.

II. Gaze Timer State Diagram

Figure 4:
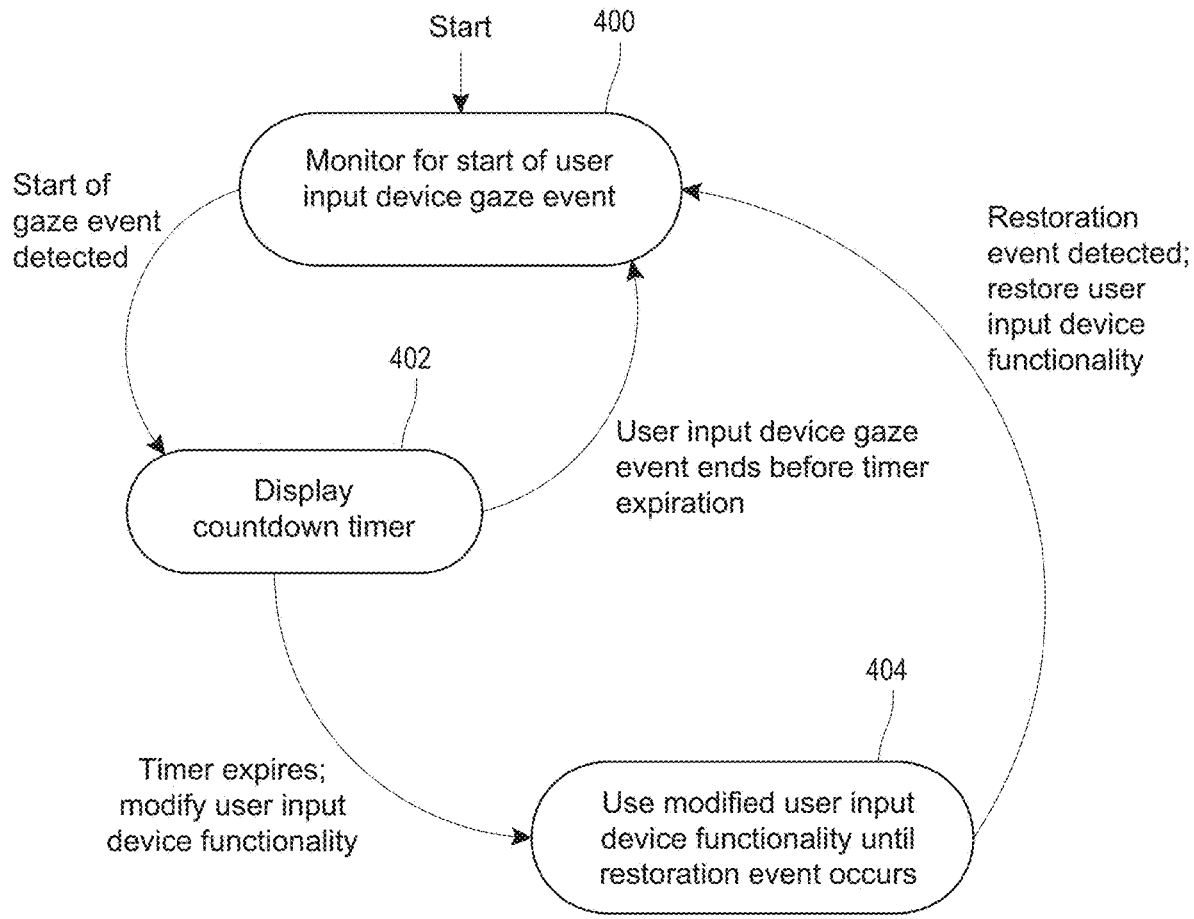
FIG. 4 is a state diagram illustrating the operation of the gaze timer feature according to one embodiment.

FIG. 4 is a state diagram illustrating one embodiment of a process that may be implemented by the wearable system 100, and particularly by the wearable computing device 106, to implement the gaze timer feature. This process may be implemented by the operating system 160 and/or by one or more of the applications 162. In the embodiment of FIG. 4, the user causes the controller's functionality to be modified by gazing at the handheld controller 104 for a set period of time. As explained below, in some embodiments, the user may extend the controller's functionality by gazing at another real world object, such as the user's hand that does not hold the controller, or the user's hand performing a particular gesture.

As illustrated by the "start" arrow, when a session, such as a mixed or augmented reality session, is started, the process enters into a monitoring state 400 in which it monitors for the start of a controller gaze event. More specifically, the process monitors sensor data reflective of the head pose and/or eye pose of the user, and reflective of the position of the handheld controller 104, to determine whether the user is gazing at, or within a predefined distance of, the controller. Methods for detecting whether the user is gazing at an object are well known in the art.

When a controller gaze event is detected, the process transitions to a "display countdown timer" state 402, and remains in this state until the gaze event ends or the countdown timer expires. The primary purpose of the timer is to avoid modifying the controller's functionality as the result of accidental controller gaze events. Stated differently, the timer's primary purpose is to reduce "false positives." In some embodiments, this purpose may be furthered by displaying to the user a visual indication, or other user feedback, that the controller gaze event is detected, so that the user can avoid the controller modification by simply looking away from the controller before the timer expires. The system may additionally or alternatively notify the user of the detection of the controller gaze event via other types of user feedback, such as an audible and/or haptic signal; for example, the controller (or a particular button on the controller) may vibrate when the gaze event is first detected.

In some embodiments, the countdown period is 0.5 seconds, but shorter and longer predetermined time periods may be used. Preferably, the time period is in the range of 0.3 seconds to 2 seconds, and more preferably, in the range of 0.4 seconds to 1.2 seconds. The real time state of the countdown timer is preferably displayed to the user graphically, such as by displaying a real time timer object (see FIG. 5B, discussed below). As illustrated by the arrow from state 402 back to state 400, if the controller gaze event ends before the timer expires, the process returns to state 400 and monitors for the next controller gaze event; the timer is also reset when this state transition occurs.

If the timer expires before the gaze event ends, the process transitions from state 402 to state 404, in which the controller's functionality is temporarily modified. The process may notify the user of this transition via user feedback, for example, a visual, haptic, and/or audible notification. If the modification applies to only a single controller button, the notification may identify this button (e.g., by outputting a haptic signal via the button), and/or may identify the new function assigned to the button (e.g., by displaying a textual message on the display 110, as shown in FIG. 5C). While in this state 404, the wearable system 100 uses the secondary mapping table 166 (FIG. 1). Thus, if a controller input event occurs while the process is in this state 404, the function performed in response to the input event will be determined based on the secondary mapping table 166. As mentioned above, different secondary mapping tables may be used by different applications 162 in some embodiments, such that the modified functionality of the controller is application-dependent. In some embodiments, additional secondary mapping tables may be used and may be associated with other controllers, devices, and/or objects. For example, a user may gaze at a phone in the user's hand, which may trigger a focus timer, which may cause a secondary mapping table associated with the phone to be accessed. The secondary mapping tables may be independent of the user's environmental context (such as recognizing what room the user is in, history data, etc.).

In the illustrated embodiment, the process remains in state 404 until a restoration event occurs. The restoration event may, for example, be one or more of the following: (1) the user uses the extended controller functionality (e.g., presses a controller button whose function has been modified), (2) the user closes a menu or other user interface opened using the extended controller functionality, (3) the user discontinues the controller gaze action without making use of the extended controller functionality. Any combination of these and other types of restoration events may be implemented within the system. Once a restoration event occurs, the process returns to the monitoring state 400 and resumes its use of the primary mapping table 164.

The above-described process is useful for handling "over-mapping" scenarios in which no controller input events (or input events of a particular type, such as button push events) are available for assigning to a particular function. Such scenarios may occur when, for example, when all buttons are already assigned to respective functions, or when all of the possible controller input events (button pushes, touchpad gestures, etc.) are already assigned to respective functions. The process may also be used in non-over-mapped scenarios. For example, although some controller input events (such as particular touchpad gestures) may remain unmapped, a developer may wish to temporarily assign a given function to a more commonly or easily used input event, such as the depression of a particular button 130b-130d. As one example, the function of the Bumper or Trigger button could temporarily be modified to cause it to display a particular menu that is not dependent upon a world context.

The process of FIG. 4 may be modified such that the gaze timer is invoked by a gaze event at another type of real world object other than the controller 104. For example, the user could extend the controller's functionality by gazing for a set period of time at the hand that does not hold the controller, at their hand performing a particular gesture such as a pointing gesture, at a particular virtual or real-world object, or any other object. Further, the target of the gaze event could dictate the controller modification that occurs upon timer expiration; for example, the system could be configured to perform one modification when the user gazes at their hand performing a first gesture, and could perform different modification when the user gazes at their hand performing a second gesture. A real-time object recognition process may be applied to the video/image stream from the externally facing camera(s) to determine whether the target of the user's gaze is something that invokes the gaze timer feature.

III. Example User Interface

FIGS. 5A-5D sequentially depict the view seen by the user through the headset 102 during use of the gaze timer feature according to one embodiment. In these drawings, the following elements are digital objects that augment the real world view seen by the user through the lenses: controller location icon 500 in FIG. 5A; gaze timer graphic 502 in FIG. 5B, textual message 504 in FIG. 5C, and menu 506 in FIG. 5D. All other objects in these views are actual physical objects as seen through the lenses.

Figure 5A:
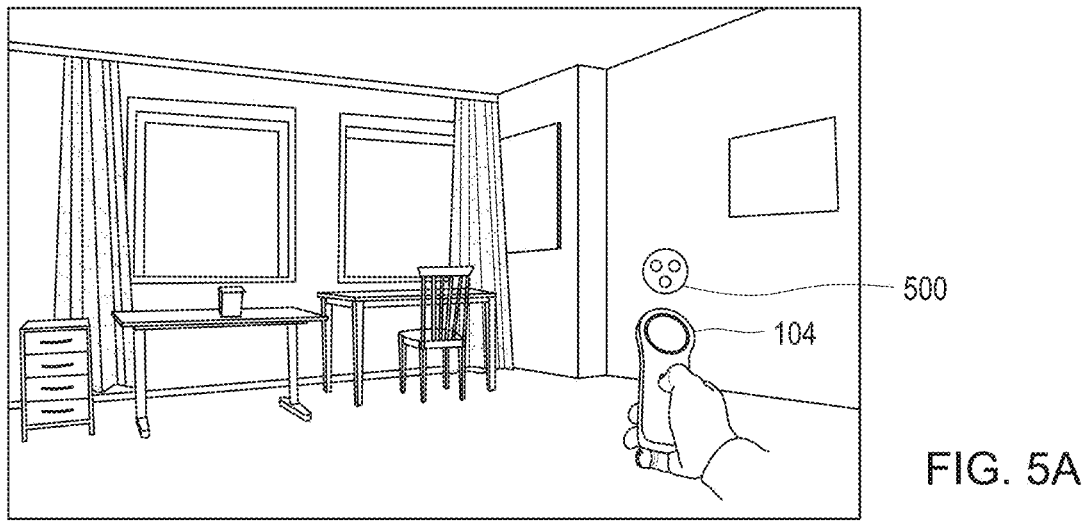
FIGS. 5A-5D sequentially depict augmented views seen through the headset during use of the gaze timer feature in one embodiment.
Figure 5B:
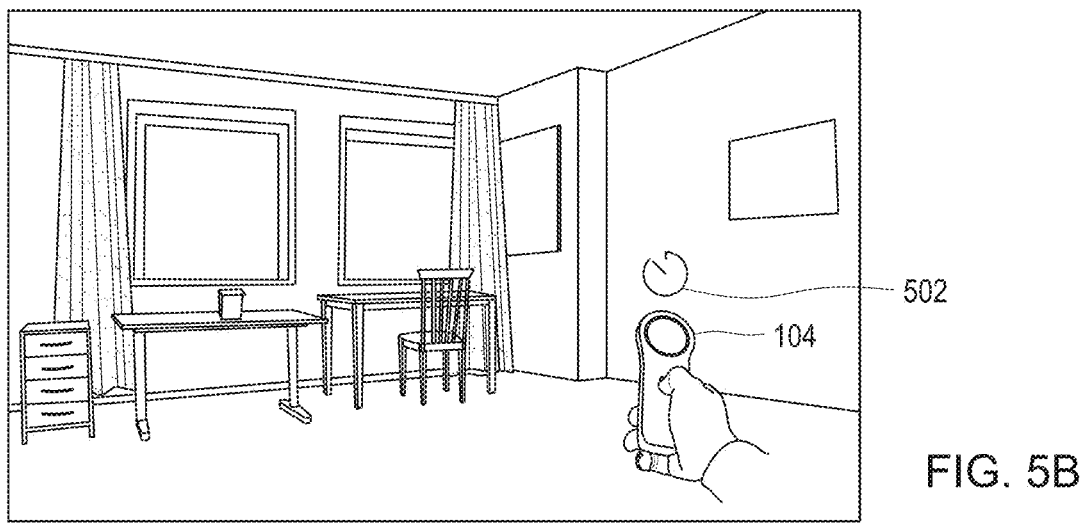
Figure 5C:
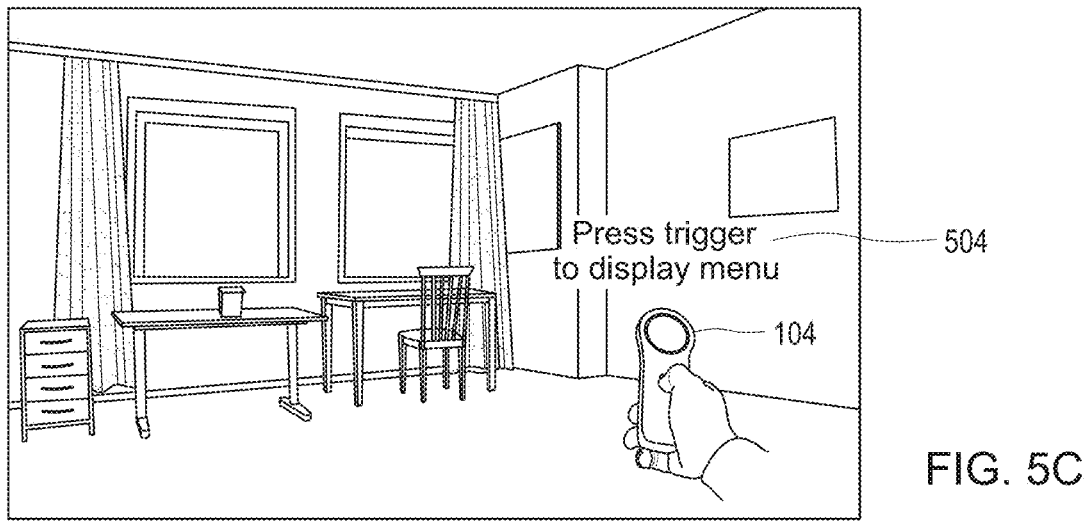

In this particular embodiment of FIGS. 5A-5D, the user gazes at the handheld controller 104 for a set period of time, at which point the controller's trigger button 130d (FIG. 3) is reconfigured based on a secondary mapping table to initiate display of a menu 506 (or other user interface) that is not otherwise displayable via the controller (using the primary mapping table). FIG. 5A illustrates the view seen by the user before the user initiates the controller gaze operation. In this example, the user is standing or sitting in a room that includes a desk, a chair, a table and windows, as seen through the lenses of the headset 102. The view in FIG. 5A also shows the user's hand holding the controller 104. The headset in this example displays a controller position icon 500 representing the real time location and pose of the controller 104 as detected by the wearable system 100 based on sensor data. As the user moves the controller 104, this icon 500 moves with the controller such that it appears a fixed distance in front of the controller in 3D space. The icon 500 may be omitted in some embodiments, and/or may be supplemented or replaced with a line or beam showing the direction in which the controller is pointed.

Although the controller 104 is visible to the user in FIG. 5A, it is not yet the target of a gaze operation, so the gaze timer is not yet started. With reference to the state diagram of FIG. 4, the system is in state 400 where the start of controller gaze event is being monitored. In one embodiment, the user can initiate the controller gaze operation by gazing at either the icon 500 or the controller 104. As discussed above, the wearable system may determine whether the user is performing a controller gaze operation based on head pose, eye pose, or both. In some embodiments, the controller gaze may be detected based on whether the user is gazing at, or within a predefined distance of, the controller position icon 500. Methods for determining whether a user is looking at a digital or physical object based on head pose and/or eye pose are known in the art.

When the controller gaze event is initially detected, the system moves from state 400 state 402 (FIG. 4) and the wearable system 100 may notify the user, such as by briefly changing the appearance of the icon 500, outputting an audible signal, and/or outputting a haptic signal via the handheld controller 104. As shown in FIG. 5B, the wearable system may also replace the icon 500 with a timer graphic 502 that graphically depicts the amount of time remaining before the timer expires (i.e., the amount of time the controller gaze operation needs to continue to cause the controller's functionality to be modified). The appearance of this timer icon 502 may change in real time as the timer counts down to zero.

Figure 5D:
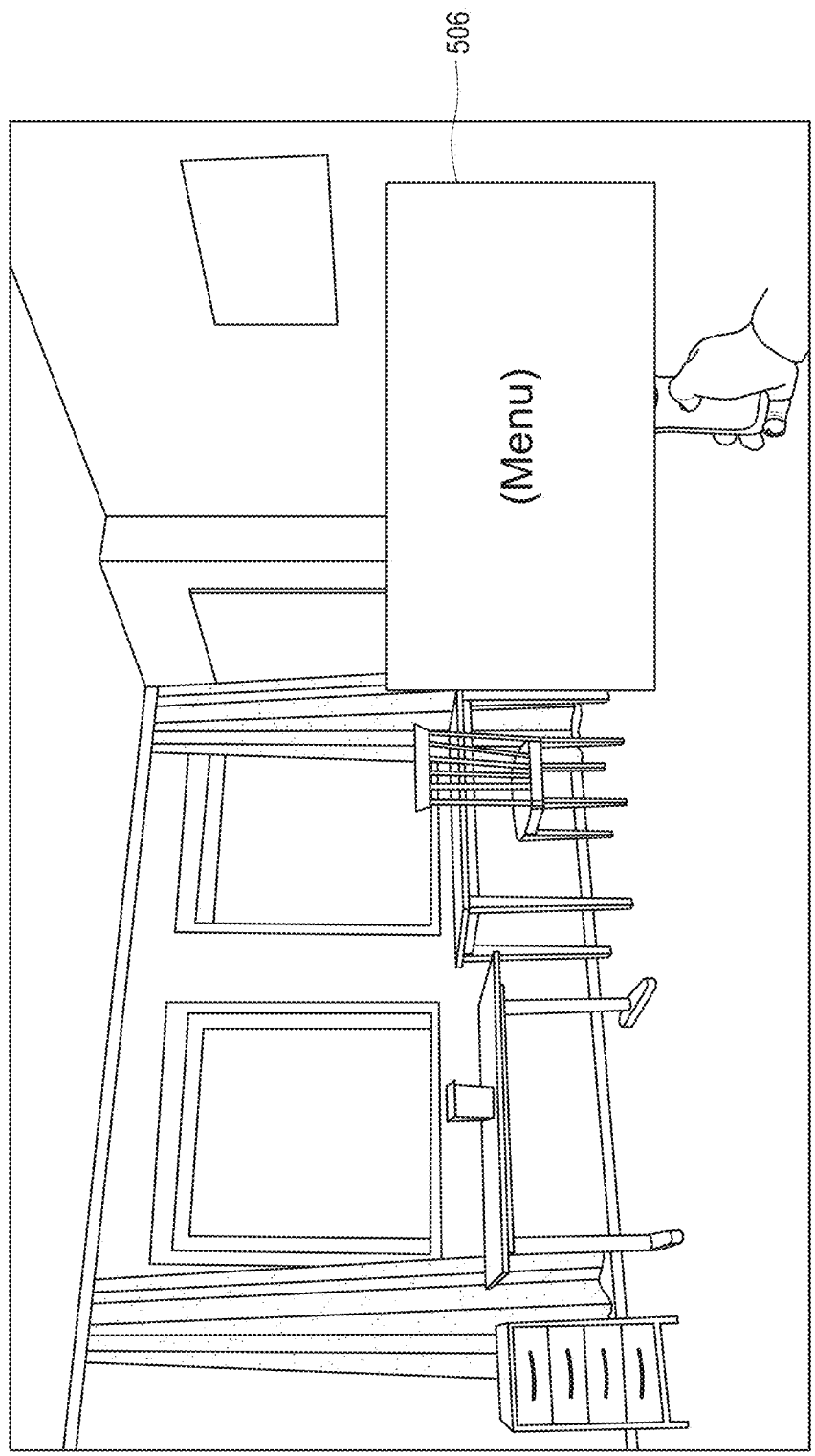

As shown in FIG. 5C, once the gaze timer expires, the system moves from state 402 to 404 (FIG. 4) where modified controller functionality is activated based on the secondary mapping table. In the example of FIG. 5C, the headset displays a textual message 504 indicating that the user may bring up a menu by pressing the controller's trigger button. The message may alternatively identify a particular button that has been remapped, without specifying the newly assigned function (e.g., "Press trigger to continue"). In use cases in which multiple controller buttons are remapped, the text message, if any, may indicate the new function assigned to each such button. If the user looks away from the controller 104 before pressing the trigger button in some embodiments, the prior functionality of the trigger button will be restored (e.g., the system returns to state 400 in the example state diagram of FIG. 4), and the display will revert back to a view of the type shown in FIG. 5A. If, on the other hand, the user presses the trigger button before looking away, an interactive menu 506 is displayed, as shown in FIG. 5D. The menu 506 in this example is not otherwise displayable via the trigger button (i.e., the trigger button is ordinarily mapped to a different function). The menu 506 may, but need not, be context dependent. Although the menu 506 is shown in FIG. 5D as being substantially opaque, a translucent menu may be displayed that enables the user to see physical object that appear behind the menu.

In some embodiments, display of this menu 506 continues after the user discontinues the controller gaze operation, and until the user performs another operation that causes the menu to be closed. For example, the menu 506 may follow the controller 104, such as by maintaining a position near the controller even as the controller is moved by the user and/or the user moves around the environment. The user may interact with the menu with a finger, using the controller 104, and/or using other known methods. In some embodiments, the display location of the menu 506 tracks the location of the controller 104; thus, the menu remains accessible to the user as the user, e.g., looks or moves around the room. The user may also be able to "drop" or "leave" the menu in a particular real world location to which the user can later return, if desired.

IV. Conclusion

The gaze timer feature as described above may be implemented in program code (instructions) executed by one or more of the components of the wearable computing system 100. For example, the gaze timer may be implemented in program instructions executed by a processor 150 (or multiple processors) of the wearable computing device 106, and/or in program instructions executed by a processor 118 (or multiple processors) of the headset. The gaze timer feature may also be implemented partly or wholly in software executed by a device or system that is not part of the wearable system 100; for example, some or all of the software for implementing the gaze timer feature could run on a local or remote computing device that communicates with the wearable system 100 over a wireless link.

The systems and methods of the disclosure each have several innovative aspects, no single one of which is solely responsible or required for the desirable attributes disclosed herein. The various features and processes described above may be used independently of one another, or may be combined in various ways. All possible combinations and sub-combinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A computerized process performed under control of program instructions executed by one or more hardware processors, the process comprising:
   detecting, based on sensor data collected during a mixed reality or augmented reality session, a gaze event in which a user gazes at, or within a defined region of, a physical object;
   in response to detecting the gaze event, starting a timer used to measure whether a duration of the gaze event satisfies a condition for temporarily modifying functionality of a handheld controller; and
   in response to determining that the duration of the gaze event satisfies the condition, modifying functionality of a user input element of the handheld controller, wherein modifying the functionality of the user input element comprises causing the user input element to be modified to a function that is not controllable via the handheld controller immediately before the gaze event, wherein the physical object is a hand of the user, and wherein the modifying the functionality of the user input element includes determining a first hand gesture or a second hand gesture of the hand of the user and causing the user input element to be modified with a first function upon the determination of the first hand gesture and with a second function upon the determination of the second hand gesture, the first function being different from the second function.

2. The computerized process of claim 1, wherein the modifying the functionality of the user input element comprises causing a button of the handheld controller to be mapped to a function of displaying a menu.

3. The computerized process of claim 1, further comprising:
   detecting a termination of the gaze event; and
   in response to detecting the termination of the gaze event, restoring a prior function of the user input element of the handheld controller.

4. The computerized process of claim 1, wherein, during the gaze event the user gazes at, or within the defined region of, the physical object other than the handheld controller.

5. The computerized process of claim 1, wherein, prior to modifying the functionality of the user input element, the process further comprises selecting at least one of the first function or the second function of the user input element from a plurality of function modifications.

6. The computerized process of claim 5, wherein the physical object is a device within a real-world environment of the mixed reality or augmented reality session.

7. The computerized process of claim 1, wherein the modifying the functionality of the user input element of the handheld controller includes selecting a function modification is based on the physical object associated with the gaze event.

8. The computerized process of claim 1, further comprising: displaying, on a display generated by a head mounted display worn by the user, a visual indication that the timer has been started.

9. The computerized process of claim 8, wherein the visual indication is a textual message.

10. The computerized process of claim 1, further comprising, in response to detecting the gaze event, generating at least one of a haptic or audible feedback signal that the timer has been started.

11. A wearable computing system, comprising:
    a head-mountable display system comprising a display and one or more sensors;
    one or more processors programmed to implement a process that comprises:
    detecting, based on sensor data collected during a mixed reality or augmented reality session, a gaze event in which a user gazes at, or within a defined region of, a physical object;
    in response to detecting the gaze event, starting a timer used to measure whether a duration of the gaze event satisfies a condition for temporarily modifying functionality of a handheld controller; and
    in response to determining that the duration of the gaze event satisfies the condition, modifying functionality of a user input element of the handheld controller, wherein modifying the functionality of the user input element comprises causing the user input element to be modified to a function that is not controllable via the handheld controller immediately before the gaze event, wherein the physical object is a hand of the user, and wherein the modifying the functionality of the user input element includes determining a first hand gesture or a second hand gesture of the hand of the user and causing the user input element to be modified with a first function upon the determination of the first hand gesture and with a second function upon the determination of the second hand gesture, the first function being different from the second function.

12. The wearable computing system of claim 11, wherein the process further comprises: detecting a termination of the gaze event; and in response to detecting the termination of the gaze event, restoring a prior function of the user input element of the handheld controller.

13. The wearable computing system of claim 11, wherein, during the gaze event the user gazes at, or within the defined region of, the physical object other than the handheld controller.

14. The wearable computing system of claim 11, wherein the modifying the functionality of the user input element of the handheld controller includes selecting a function modification is based on the physical object associated with the gaze event.

15. A wearable computing system, comprising:
a head-mountable display system comprising a display and one or more sensors;
one or more processors programmed to implement a process that comprises:
detecting, based on sensor data collected during a mixed reality or augmented reality session, a gaze event in which a user gazes at, or within a defined region of, a physical object;
in response to detecting the gaze event, starting a timer used to measure whether a duration of the gaze event satisfies a condition for temporarily modifying functionality of a handheld controller; and
in response to determining that the duration of the gaze event satisfies the condition, modifying functionality of a user input element of the handheld controller, wherein modifying the functionality of the user input element comprises causing the user input element to be modified to a function that is not controllable via the handheld controller immediately before the gaze event,
wherein the modifying the functionality of the user input element comprises causing a button of the handheld controller to be mapped to a function of displaying a menu, and wherein the process further comprises:
detecting a closing of the menu; and in response to detecting the closing of the menu, restoring a prior function of the button of the handheld controller.

16. A wearable computing system, comprising:
a head-mountable display system comprising a display and one or more sensors;
and
one or more processors programmed to implement a process that comprises:
detecting, based on sensor data collected during a mixed reality or augmented reality session, a gaze event in which a user gazes at, or within a defined region of, a physical object;
in response to detecting the gaze event, starting a timer used to measure whether a duration of the gaze event satisfies a condition for temporarily modifying functionality of a handheld controller; and
in response to determining that the duration of the gaze event satisfies the condition, modifying functionality of a user input element of the handheld controller, wherein modifying the functionality of the user input element comprises causing the user input element to be modified to a function that is not controllable via the handheld controller immediately before the gaze event,
wherein, prior to modifying the functionality of the user input element, the process further comprises selecting a function modification of the user input element from a plurality of function modifications, wherein the physical object is a device within a real-world environment of the mixed reality or augmented reality session, and wherein the selecting of the function modification of the user input element from the plurality of function modifications includes selecting the function modification is based on the device associated with the gaze event.

\* \* \* \* \*

UNITED STATES PATENT AND TRADEMARK OFFICE
CERTIFICATE OF CORRECTION

| | | |
|---|---|---|
| PATENT NO. | : 12,405,659 B2 | Page 1 of 1 |
| APPLICATION NO. | : 18/758690 | |
| DATED | : September 2, 2025 | |
| INVENTOR(S) | : Stolzenberg et al. | |

It is certified that error appears in the above-identified patent and that said Letters Patent is hereby corrected as shown below:

In the Claims

In Column 12, Claim 11, Line 35, delete "sensors;" and insert -- sensors; and --, therefor.

In Column 13, Claim 15, Line 12, delete "sensors;" and insert -- sensors; and --, therefor.

Signed and Sealed this
Seventh Day of October, 2025

John A. Squires
*Director of the United States Patent and Trademark Office*